(12) United States Patent
White et al.

(10) Patent No.: US 9,417,398 B2
(45) Date of Patent: Aug. 16, 2016

(54) PLASTIC OPTICAL FIBRES

(71) Applicant: BAE SYSTEMS plc, London (GB)

(72) Inventors: Henry Jameson White, South Gloucestershire (GB); Geoffrey Martland Proudley, South Gloucestershire (GB); Ying Lia Li, Avon (GB)

(73) Assignee: BAE SYSTEMS plc, London (GB)

( * ) Notice: Subject to any disclaimer, the term of this patent is extended or adjusted under 35 U.S.C. 154(b) by 125 days.

(21) Appl. No.: 14/347,848

(22) PCT Filed: Sep. 20, 2012

(86) PCT No.: PCT/GB2012/052317
§ 371 (c)(1),
(2) Date: Mar. 27, 2014

(87) PCT Pub. No.: WO2013/045896
PCT Pub. Date: Apr. 4, 2013

(65) Prior Publication Data
US 2014/0233886 A1  Aug. 21, 2014

(30) Foreign Application Priority Data
Sep. 28, 2011  (GB) .................................. 1116675.8

(51) Int. Cl.
*G02B 6/26* (2006.01)
*G02B 6/38* (2006.01)
(Continued)

(52) U.S. Cl.
CPC . *G02B 6/38* (2013.01); *B29C 59/02* (2013.01); *B29D 11/00663* (2013.01);
(Continued)

(58) Field of Classification Search
CPC .. G02B 6/02033; G02B 6/2552; G02B 6/262; G02B 6/3846; G02B 6/38; G02B 6/32; G02B 6/4298; B29C 59/02; B29C 59/021; B29C 65/2076; B29C 66/0222; B29C 66/0242; B29C 66/1142; B29C 66/322; B29C 66/69; B29C 66/71; B29C 66/723; B29L 2011/0075; B29D 11/00663
USPC .......................................................... 385/31
See application file for complete search history.

(56) References Cited

U.S. PATENT DOCUMENTS 4,191,447 A * 3/1980 Borsuk ................ G02B 6/2552
                                                              29/522.1
4,433,898 A    2/1984 Nasiri
(Continued)

FOREIGN PATENT DOCUMENTS

DE    2557472 A1    6/1977
DE    19911982 A1 * 10/2000 ............... G02B 6/25
(Continued)

OTHER PUBLICATIONS

International Preliminary Report on Patentability and Written Opinion of The International Searching Authority received for Patent Application No. PCT/GB2012/052317, mailed on Apr. 10, 2014, 11 pages.
(Continued)

*Primary Examiner* — Ryan Lepisto
*Assistant Examiner* — Guy Anderson
(74) *Attorney, Agent, or Firm* — Finch & Maloney PLLC

(57) ABSTRACT

The invention relates to methods and devices for shaping plastic optical fibers (POFs), more specifically for optically modifying and yet more specifically for rapidly joining two portions of the plastic optical fibers to create a new optical connection.
The plastic optical fibers may be heated under controlled conditions, to soften them and lens, sensor or patterns may be imprinted on portions of the fiber. Methods are provide to optical joints, and combined physical and optical joints.

11 Claims, 5 Drawing Sheets

(51) Int. Cl.
    B29D 11/00 (2006.01)
    G02B 6/255 (2006.01)
    B29C 59/02 (2006.01)
    G02B 6/42 (2006.01)
    B29L 11/00 (2006.01)
    B29C 65/20 (2006.01)
    B29C 65/00 (2006.01)
    G02B 6/32 (2006.01)

(52) U.S. Cl.
    CPC ............ *G02B 6/2552* (2013.01); *G02B 6/262* (2013.01); *G02B 6/4298* (2013.01); *B29C 59/021* (2013.01); *B29C 65/2076* (2013.01); *B29C 66/0222* (2013.01); *B29C 66/0242* (2013.01); *B29C 66/1142* (2013.01); *B29C 66/322* (2013.01); *B29C 66/69* (2013.01); *B29C 66/71* (2013.01); *B29C 66/723* (2013.01); *B29L 2011/0075* (2013.01); *G02B 6/32* (2013.01)

(56) References Cited

U.S. PATENT DOCUMENTS

| | | | |
|---|---|---|---|
| 4,510,005 A | 4/1985 | Nijman | |
| 4,544,231 A * | 10/1985 | Peterson | G02B 6/241 385/71 |
| 4,805,985 A | 2/1989 | Fleck | |
| 5,511,140 A * | 4/1996 | Cina | G02B 6/4204 359/362 |
| 6,282,347 B1 * | 8/2001 | Ono | G02B 6/32 385/31 |
| 6,361,219 B1 * | 3/2002 | Blyler, Jr. | B29C 67/0044 385/85 |
| 6,671,432 B2 * | 12/2003 | Imada | G02B 6/02033 385/33 |
| 6,706,221 B1 * | 3/2004 | Kikuchi | G02B 6/2552 264/1.24 |
| 6,826,329 B2 * | 11/2004 | Imada | G02B 6/4204 385/35 |
| 6,960,029 B2 * | 11/2005 | Iijima | G02B 6/25 385/85 |
| 2001/0028761 A1 * | 10/2001 | Imada | G02B 6/4204 385/35 |
| 2001/0038737 A1 * | 11/2001 | Imada | G02B 6/02033 385/33 |
| 2004/0076375 A1 * | 4/2004 | Imada | G02B 6/02033 385/38 |
| 2005/0150255 A1 * | 7/2005 | Tang | B29C 67/0044 65/387 |
| 2012/0061863 A1 * | 3/2012 | Cox | B29C 33/3842 264/1.7 |

FOREIGN PATENT DOCUMENTS

| | | |
|---|---|---|
| EP | 0393601 A2 | 10/1990 |
| JP | 62008104 A | 1/1987 |
| JP | 01271711 A | 10/1989 |
| KR | 20090131451 A | 12/2009 |
| WO | 2013045896 A1 | 4/2013 |

OTHER PUBLICATIONS

International Search Report received for Patent Application No. PCT/GB2012/052317, mailed on Feb. 26, 2013, 7 pages.

GB Intellectual Property Office Search Report under Section 17(6) received for GB Patent Application No. 1116675.8, mailed Jun. 14, 2012, 4 pages.

* cited by examiner

PLASTIC OPTICAL FIBRES

The following invention relates to methods and devices for shaping plastic optical fibres (POFs), more specifically for optically modifying and yet more specifically for rapidly optically joining two portions of the plastic optical fibres to create a new optical connection.

Plastic optical fibres are known, cheaper alternatives to expensive silica based fibre optic cables. Typically the plastic optical fibres typically have core diameters from 0.25 mm to 1 mm and are typically made from Poly methylmethacrylate (PMMA), due to the desirable optical properties.

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

According to a first aspect of the invention there is provided a method of shaping a plastic optical fibre, comprising the steps of selecting a portion of fibre to be shaped,
providing a shaping surface, which comprises a template which imparts a pattern onto the portion of fibre,
causing heating and mating of the portion of fibre and said shaping surface;
causing the portion of fibre to be softened, such that it is capable of moulding to the surface structure defined on the template on said shaping surface, during mating, so as to impart the pattern onto the portion of fibre;
causing the surface of the portion of fibre to cool such that portion of fibre comprising the pattern sets.

Plastic optical fibres typically comprise a PMMA core surrounded by a lower index cladding and a sheath or jacket to protect the fibre. The sheath may be stripped back in part, to allow the PMMA material to be shaped. It may be desirable for a new portion of sheathing or jacketing material to be located over any stripped back parts that do not require exposure.

In one arrangement the portion of fibre may be heated to a softened state prior to mating with the template, such that there is provided, a method of shaping a plastic optical fibre, comprising the steps of;
selecting a portion of fibre to be shaped;
providing a shaping surface, which comprises a template which imparts a pattern onto the portion of fibre,
causing the portion of fibre to be soften, such that it is capable of moulding to the surface structure defined on the template on said shaping surface,
causing mating of the portion of fibre and said shaping surface so as to imprint the pattern on to the portion of fibre;
causing the surface of the portion of fibre to cool such that portion of fibre comprising the pattern sets.

In the arrangement where the shaping surface provides the heating means, there is provided, a method of shaping a portion of plastic optical fibre, comprising the steps of;
selecting a portion of fibre to be shaped;
providing a shaping surface, which comprises a template which imparts a pattern onto the portion of fibre;
causing mating of the portion of fibre and said shaping surface;
causing the portion of fibre to be softened, such that it is capable of such that it is capable of moulding to the surface structure defined on the template on said shaping surface,
further urging the portion of fibre and said shaping surface together, so as to imprint the pattern on the portion of fibre;
causing the surface of the portion of fibre to cool such that portion of fibre comprising the pattern sets.

The heating step may be provided by resistive, conductive or inductive heating, typical heating sources may be resistive wires, heater elements or coils, lasers, microwave. Preferably, only a minimum portion of the fibre is heated, preferably the portion of the fibre that is to be shaped is heated, such as, for example, only the terminal end is heated. Where there is a connection to be made, the portion of fibre and optionally the jacket of the fibre may be heated, so as to assist in bonding the plastic optical fibres.

In a further arrangement the shaping surface comprising the template may be heated such that portion of fibre softens, on mating contact with said heated surface. Preferably the shaping surface is a heater, such as for example, the shaping surface may be selected from a material which is capable of undergoing resistive heating. Preferably the shaping surface is selected from a metal, metalloid, silica, silicon.

In a highly preferred arrangement, a release material may be applied to the surface of the shaping surface to facilitate release of the shaped portion of fibre. In a highly preferred arrangement the shaping surface, specifically the template, comprises a surface coating of said release material, such as, for example a layer of a release agent, a polymer, particularly a fluoropolymer, such as for example Teflon. The surface coating provides an increase in the optical smoothness of the imprinted pattern.

The step of cooling the portion of fibre, may be effectively implemented by cooling the shaping surface to cause concomitant cooling of the portion of fibre, such that the imprinted pattern sets to the required shape. This reduces the risk that the final patterned shape imparted onto the portion of fibre does not change due to the softened material potentially flowing, and changing shape during the cooling process.

The shaping surface may be used to provide either or preferably both the heating and cooling steps, such that the heating and/or cooling rates may be carefully controlled, to improve homogeneity of the final joined portions of fibre, so as to reduce incidence of rapid thermal shock, which may degrade the optical properties, due to altering the composition, crystalline structure or Tg of the plastic optical fibre. Further, the controlled heating and cooling rates reduce the incidence of defects and scattering sites in the material.

The plastic optical fibre may have at least one pattern imparted on part or all of the side wall, or one or both terminal ends. The patterns on the side wall, i.e. longest dimension, may be used to alter the optical properties at various points along some or all of the plastic optical fibre, such as, for example to allow input and/or output at various points along the longest length, so as to provide a sensor arrangement along at least a portion of the plastic optical fibre. The pattern provided on the side wall of the fibre may require the corresponding aperture to be created in the outer cladding and jacket of said plastic optical fibre. Notches or apertures in the outer cladding and jacket may be used for light leakage (e.g. for lighting applications). More complex patterning could be envisaged for sensor applications and also add/drop functions for multiplexing. In a preferred arrangement the pattern is imparted on one or both terminal ends, such as for example to reduce divergence of any light transmitted from a plastic optical fibre.

The pattern may be selected from any optically active configuration, such as a lens, patterned array, repeating motif, or diffraction grating. It will be evident that the template on the shaping surface will be required to be the negative relief of the desired pattern to be imprinted on the plastic optical fibre, such as, for example a concave template will provide a reciprocal convex pattern on the plastic optical fibre.

The optical lens may be selected as a convergent or divergent lens, such as for example a Fresnel lens.

The patterned array may provide a sensor device, which may further comprise an active material, such as, for example a doping agent, surface coatings, such as metals or compounds, such that said sensor device, provides a measureable response in relation to an input stimulus impinging on said patterned array and active material. The input stimulus may provide changes that are sensed by the patterned array and active material, such stimuli may be chemical such as for example, humidity, species concentration, changes in refractive indices, or physical, such as, for example, stress, strain, optical light detection such as, for example, IR, UV or visible light.

The input stimulus data may be collected by the patterned array and transferred to a detector remote from the sensor. Silica fibre optics have been stamped with a dense two dimensional array of pillars, and made SERS active by coating with silver.

According to a further aspect of the invention there is provided a plastic optical fibre, wherein a part or all of the plastic optical fibre comprises at least one pattern selected from at least one optical lens configuration, at least one patterned array, or at least one diffraction grating, provided by a method according to the invention. Preferably the plastic optical fibre, comprises at least one terminal end, which comprises a pattern selected from at least one optical lens configuration, at least one patterned array, or at least one diffraction grating.

According to a further aspect of the invention there is a method of creating a physical and optical link between two plastic optical fibres, comprising the steps of
providing a first plastic optical fibre, comprising a first terminal end with a first pattern,
providing a second plastic optical fibre cable, to be physically and optically linked to said first plastic optical fibre, comprising a first terminal end with a second pattern;
optionally providing a connector to house said joined first and second plastic optical fibres;
causing mating union of said first and second fibres;
wherein the first pattern and second pattern are selected such that they are complementary and can be physically mated together.

The mating union may further require the use of an adhesive to retain the mating union, alternatively the optional connector may provide mechanical means of securing the two plastic optical fibres in mating union, such as, for example via a clamp. Preferably a small amount of the PMMA may be allowed to flow within the connector, thereby avoiding the use of epoxies to bond the two portions of fibres into the connector. Any gripping or ridge structures present in the connector would the ridge pattern to enhance retention.

The first and second patterns, may be any form of protrusion and reciprocal void, preferably the protrusion and void are selected that they do not degrade the optical properties of the plastic optical fibre. The protrusion may be selected from a lens configuration.

The direct mating of a protrusion and reciprocal void via physical contact joint may cause undue stress at the point of joining, especially when the connection is exposed to mechanical stress during routine operation. In a further aspect of the invention there is provided a method creating an optical link between two plastic optical fibres, comprising the steps of providing a first plastic optical fibre comprising a first terminal end with a first optical lens pattern
providing a second plastic optical fibre cable, to be optically linked to said first plastic optical fibre, comprising a first terminal end with a second optical lens pattern;
providing a connector to house said joined first and second plastic optical fibres;
wherein the plastic fibres within the connector are separated by a distance less than 100 mm.

Preferably, the plastic optical fibres are separated by a distance, less than 100 mm, more preferably in the range of 5 to 80 mm, yet more preferably in the range of from 20 to 50 mm.

In a further arrangement, there is provided a method creating a physical and optical link between two plastic optical fibres, comprising the steps of
providing a first plastic optical fibre and a second plastic optical fibre whose terminal ends are to be joined,
providing a connector to house a portion of the two respective ends of said plastic optical fibres,
heating both terminal ends to the point of melting, mating together said respective ends,
causing cooling of said formed joined plastic optical fibre.

In a highly preferred arrangement the heating and cooling stage are caused by thermal transfer via the connector or a thermal controller system located in the connector. The thermal controller system may be a heater element such as, for example a plate or ring which is located around the connector or more preferably in thermal contact with the plastic optical fibres to be joined. Preferably the thermal controller is removable from the connector, such that the thermal controller system may be used repeatedly, with many connectors. The thermal controller system may permit more localised heating of the PMMA. This allows the connector to be made from materials which do not need to capable of withstanding autoclave temperatures.

There may be provided a connection device, which houses one or more connectors, and further comprises the thermal controller system, to provide heat, and optionally to actively cool, or at least cause predetermined cooling rates, on the connector and hence via thermal transfer to impart said thermal conditions to the first and second plastic optical fibres located therein. The thermal controller may comprise a heater so as to bring the two plastic optical fibres up to a softened molten temperature, which is sufficient for the plastic material to flow and allow the two plastic optical fibres to be fused together to form a new continuous fibre.

The thermal controller, may either then reduce the heat output from the heater at a controlled cooling rate, or alternatively the thermal controller may comprise a heat exchange device to actively cool the connector and associated fused plastic optical fibre, such as, for example a Peltier element, which may actively cool the fused plastic optical fibre.

Where a new physical joint is made, the connector may optionally be removable and replaced by a conventional sleeve material, so as to allow reuse of the connector, and to reduce the profile of the connector, as there may be restricted space in the final device that incorporates the plastic optical fibre, such as, for example a conduit or trunking.

Where a new physical joint is to be made, the terminal ends may be shaped to maximise the contact area so as to enhance the fusing process. The terminal ends may comprise perpendicular ends, slanted, curved, stepped or any shape which permits facile union of the plastic optical fibres to be joined.

The light source which transmits through the POF may be any light source such as, for example, laser, LED or OLED. To improve optical and optionally physical connectivity, the POF and light source may be mated together. In a further aspect of the invention there is provided a method creating a link between an LED and at least one plastic optical fibre, comprising the steps of:

providing a plastic optical fibre comprising a first terminal end with a with a first pattern, which is the reciprocal of the outer surface of the LED;

optionally comprising the steps of heating said first terminal end to the point of melting, mating together with said LED, causing cooling of said joined LED-plastic optical fibre.

An embodiment of the invention will now be described by way of example only and with reference to the accompanying drawings of which:

Figure 1:
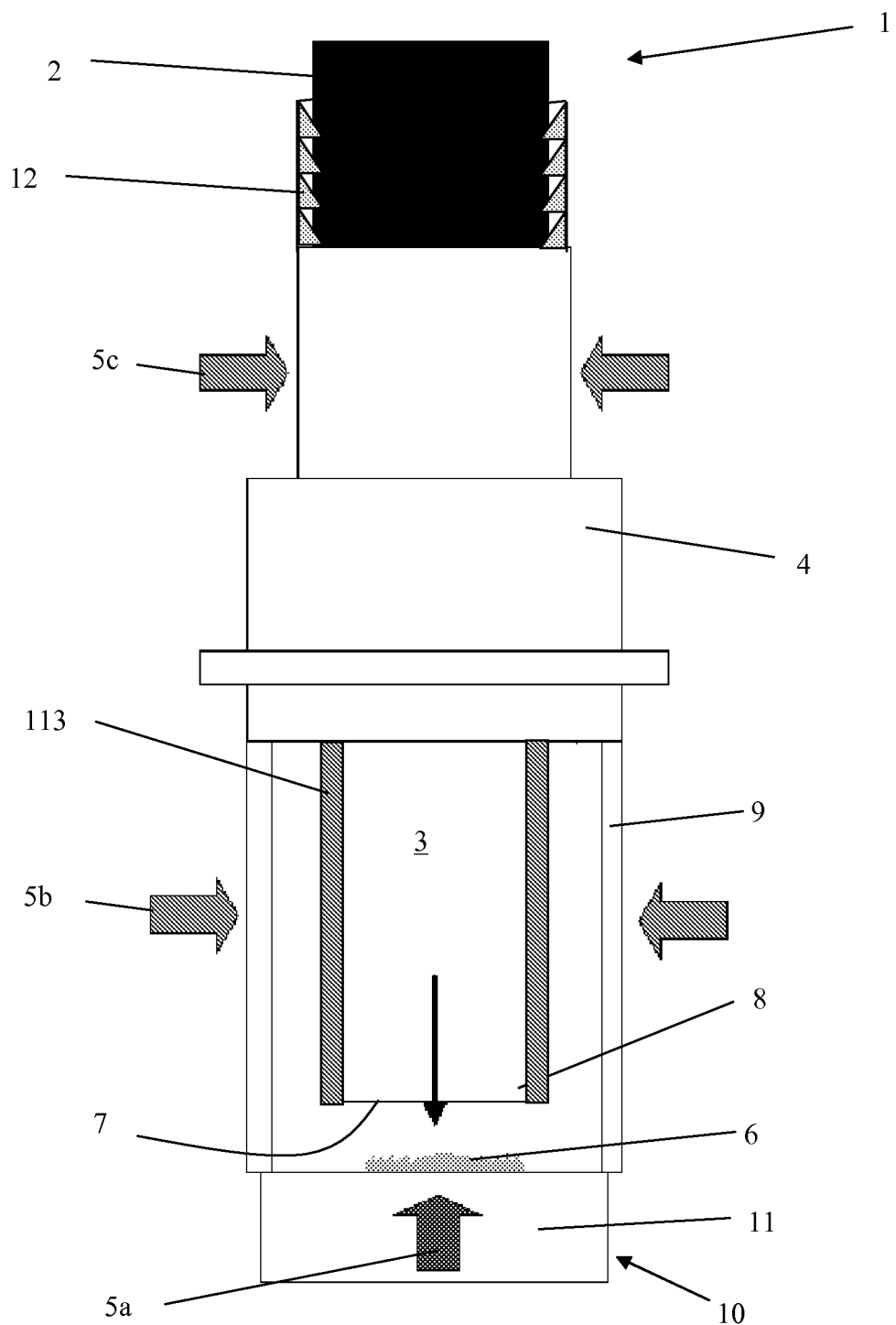
FIG. 1 shows a side view of a heated template on a shaping surface and a co-located POF

Turning to FIG. 1, there is provided a POF 1, comprising a protective sheath 2, and a PMMA core 3. The sheath 2 has been paired back, such that only the PMMA core 3 protrudes through a connector 4. The sheath 2 is gripped and held by ridged portion 12. The connector 4 is then inserted into a shaping system 10, comprising a base 11, optionally containing a heater 5a, and a housing 9. The PMMA 3 core may be located in a support 113, to prevent the core from moving during the heating and cooling steps. The PMMA 3 is softened to a point of melting, which may be achieved by heating the housing 9, via heaters 5b, or heaters 5c located proximate to the connector 4. On the base 11 there is provided a template 6, which imparts a pattern 7 (specific pattern not shown) on the tip of the POF 8. In a preferred arrangement the template 6 comprises a heater 5a, such that the template heats up and only melts the tip of the POF 8, and imparts the required pattern 7. More preferably the template 6 is a heater. By only heating the minimum portion of the PMMA, it reduces any optical degradation of the remainder of the PMMA core 3.

Figure 2:
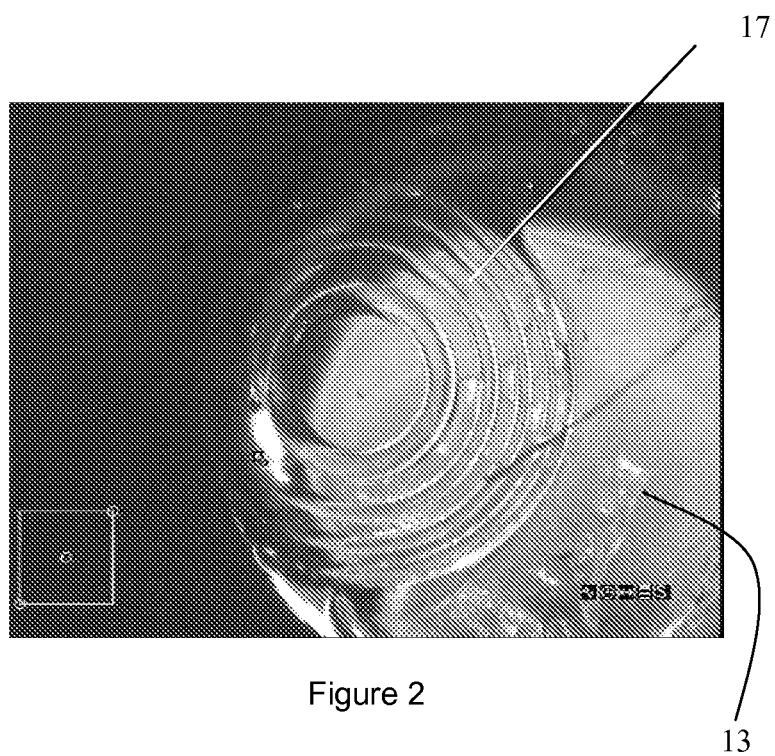
FIG. 2 shows a close up of a lens structure on a POF.

FIG. 2 shows a highly magnified view of the tip of a PMMA core 13, on which there has been imprinted a lens 17, formed by the apparatus in FIG. 1. The lens 17 is slightly off-centre, due to no fiducial marks being employed in the experiment.

Figures 3A, 3B:
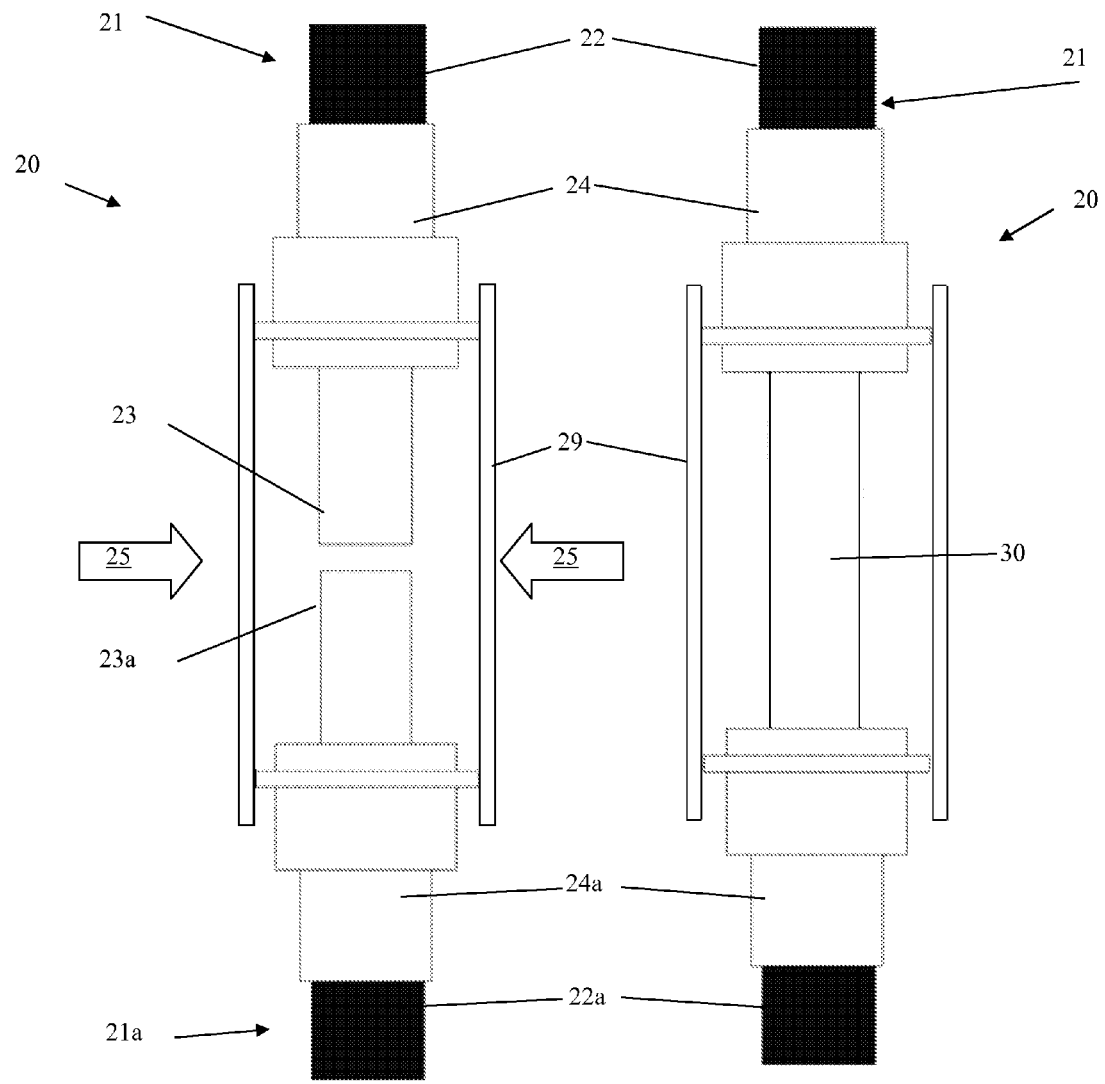
FIGS. 3a and 3b show a cross section of a POF connecting device.

FIG. 3a shows a POF connecting device 20, which comprises a heater 25, a housing 29 to contain the connectors 24, 24a. The connecting device 20, locates two separate POFs 21 and 21a to be joined. The POFs' 21, 21a respective sheaths 22, 22a, as described in relation to FIG. 1, are paired back so as only to allow the PMMA cores 33, 33a to protrude through connectors 24, 24a. The connectors 24, 24a are located in a housing 29. A heat source 25 is applied to the PMMA 23, 23a, preferably at the tips, or via the housing 29, so as to soften the PMMA cores 23, 23a. The two POFs 21, 21a are then pushed together by moving the connectors 24, 24a towards each other or by feeding though more PMMA core 23, 23a, till the two cores meet and are held together to create a new single PMMA core 30. The PMMA core 30 will then be cooled, and either left in the housing 29 and connectors 24, 24a There may be further guides and housing members (not shown) to ensure that the PMMA 23, 23a does not distort out of shape during heating.

Figure 4A:
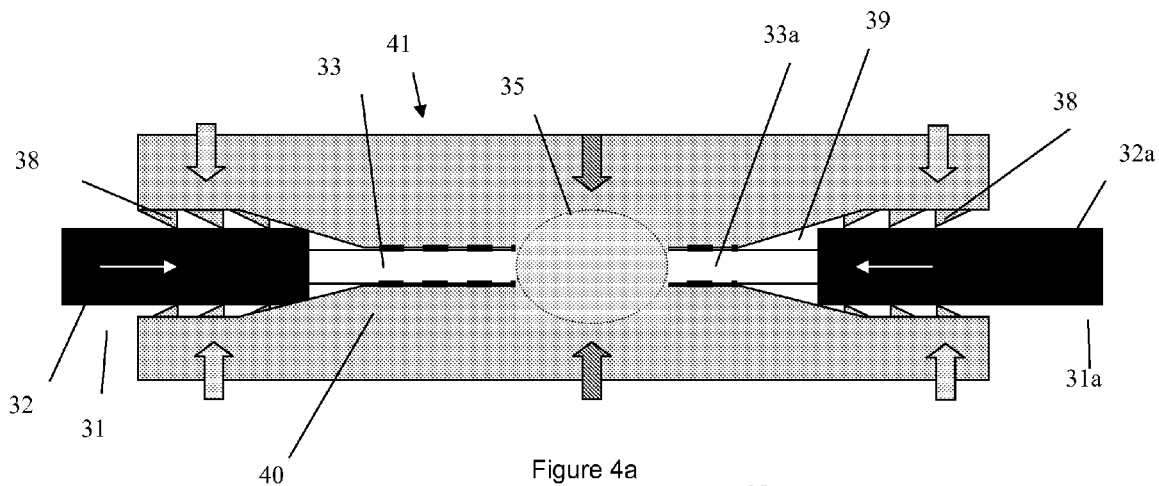
FIGS. 4a, 4b and 4c show cross sections of additional POF connecting devices.

FIG. 4a shows a POF connecting device 41, which comprises a heater 35, a housing 40 to contain the two separate POFs 31 and 31a to be joined. The POFs' respective sheaths 32, 32a are paired back so as only to allow the PMMA cores 33, 33a to protrude through in to the connector 40. The connector 40 may further contain flanges or grips 38, which clamp down on the sheathed POF 31, 31a, to hold it in place. A heat source 35 is applied to the PMMA 33, 33a, preferably direct at the tips, so as to soften the PMMA cores 33,33a. The two POFs 31, 31a are then pushed together by moving the tow POFs 31, 31a further into the connecting device 41, and hence towards each other till the two cores meet and are held together to create a new single PMMA core not shown. The newly formed PMMA core will then be cooled, and either left in the housing 40. Any flow of PMMA material may fall into the void 39 or the grip area 38, such that any degree of flowed material does not cause a pressure build up in the connector 41.

Figure 4B:
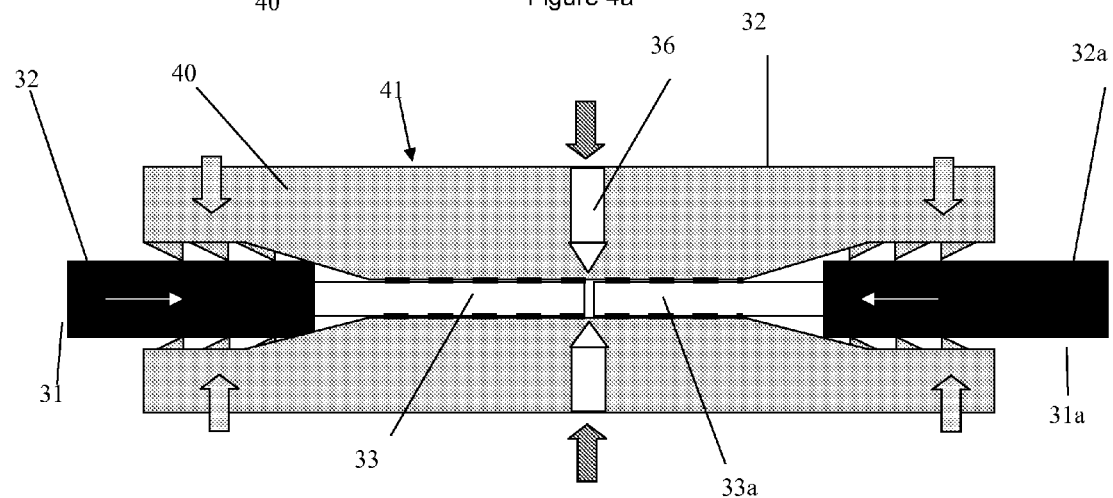

FIG. 4b, shows a heater ring 36 which conducts heat from an external heater. The heater ring 36 passes through the connector 40, thereby allowing the heater ring 36 to be thermally insulated from rest of assembly to give local heating at the point of the join of PMMA 33, 33a.

Figure 4C:
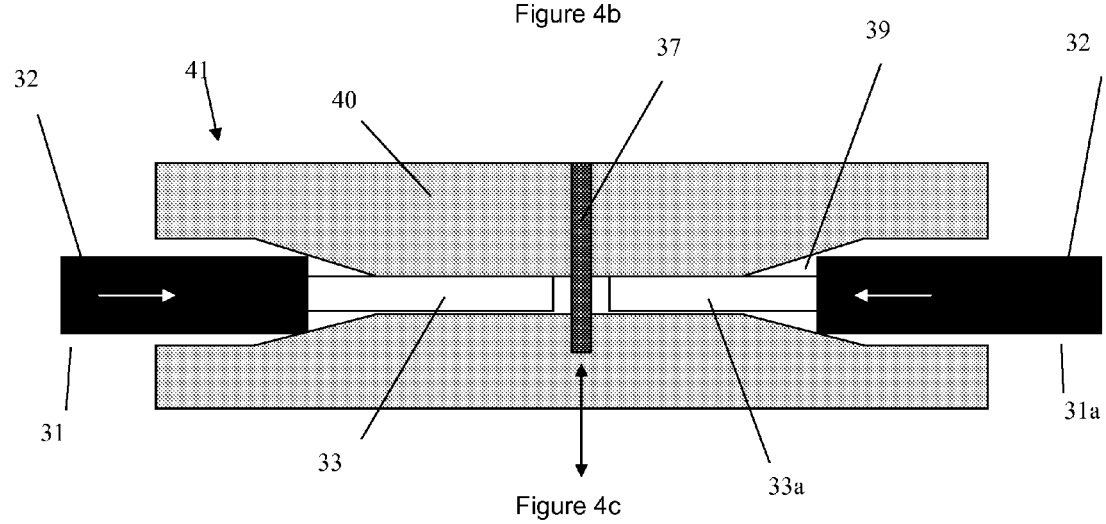

FIG. 4c shows a moveable heater plate 37 The POFs 33, 33a are held in thermal contact with plate 37, till the POFs become capable of forming a new joint, the plate 37 is then withdrawn, and the hot fibres 33, 33a are pushed together to fuse and create a new joint. The heater is then capable of being deployed on another connector 41.

Figure 5A:
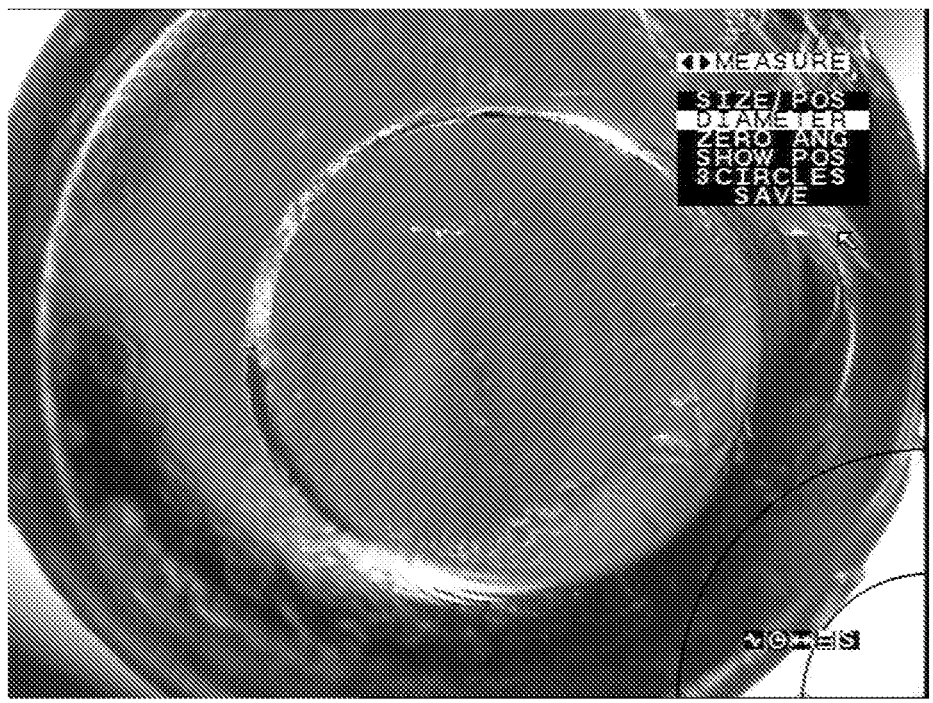
FIG. 5a, 5b show the effect of coated and uncoated heated template.
Figure 5B:

FIG. 5a shows a circular recess formed in an end face of a POF, where the heated silicon template was coated with Teflon. FIG. 5b, shows the same recess where the heated silicon template was not coated with Teflon. The surface of FIG. 5b, clearly shows pitting on the surface, which may affect the optical properties of the imprinted configuration on the POF. FIG. 5a is relatively defect free, from a visual perspective.

EXPERIMENTAL

The sheathing was paired back several mm. The shaping surface was heated to a temperature in the approximate range of 140-160° C. The POF was held in place by a clamp system as shown in FIG. 1, below. The POF core was held in thermal contact with the surface for 30 to 60 seconds until the terminal end had adopted the shape of the template in the shaping surface. The heater in the shaping surface was turned off and the POF was removed from the shaping surface and allowed to cool naturally.

It is desirable that the plastic optical fibre is located at the correct position on the template on the surface of the shaping surface. The use of fiducial marks in for an optical alignment process or laser interferometery for scaled up production may be used to ensure that the plastic optical fibre and the template on the shaping are correctly aligned.

Experiment 2

A shaping surface template was formed from a silicon heater material and was shaped to provide a 60 μm recess in a 500 μm diameter POF. The same heating and cooling conditions as outlined in experiment 1 were used. The template surface was untreated and the resulting imprinted pattern can be seen in FIG. 5b. The experiment was repeated wherein the template surface was coated with a layer of Teflon, and the same process as above was repeated. The improved smoothness of the formed surface can be readily seen with the aid of a microscope, FIG. 5a, such that there is reduced surface pitting, which provides improved optical performance of any lens, or sensor or diffraction grating pattern imparted thereon.

The invention claimed is:

1. A method of creating an optical link between two portions of plastic optical fibres, the method comprising:
   providing a first plastic optical fibre comprising a first terminal end with a first optical lens pattern, and
   providing a second plastic optical fibre cable, to be optically linked to said first plastic optical fibre, the second plastic optical fibre cable comprising a first terminal end with a second optical lens pattern, wherein said optical lens patterns are formed by selecting a portion of fibre to be shaped, the selecting comprising:
   providing a shaping surface with a release material thereon, said shaping surface comprising a template which imparts a pattern onto the portion of fibre;
   causing heating and mating of the portion of fibre and said shaping surface;
   causing the portion of fibre to be softened, such that it is capable of moulding to the surface structure defined on the template on said shaping surface, during mating, so as to impart the pattern onto the portion of fibre;
   causing the surface of the portion of fibre to cool such that portion of fibre comprising the pattern sets, wherein the cooling comprises cooling the shaping surface while in mating union with the portion of fibre; and
   providing a connector to house said joined first and second plastic optical fibres; wherein the plastic fibres within the connector are separated by a non-zero distance less than 100 millimeters.

2. A method according to claim 1, wherein the shaping surface is heated such that said portion of fibre softens, on mating contact with said heated surface.

3. A method according to claim 1 wherein the heating and cooling have controlled rates.

4. A method according to claim 1 wherein the portion of fibre is a terminal end of the portion of fibre.

5. A method according to claim 1 wherein the pattern is selected from an optical lens configuration, patterned array, or diffraction grating.

6. A method according to claim 5 wherein the lens is a convergent or divergent lens.

7. A method according to claim 1, wherein the first optical lens pattern and the second optical lens pattern are selected such that they are complementary.

8. A method according to claim 1, wherein the wherein the plastic fibres within the connector are separated by a distance of at least 5 millimeters.

9. A method according to claim 1, wherein the release material is configured to facilitate release of the portion of the fibre from the shaping surface.

10. A method according to claim 1, wherein the release material comprises a polymer.

11. A method according to claim 10, wherein the polymer is a fluoropolymer.

* * * * *